(12) United States Patent
Genthikatti et al.

(10) Patent No.: US 12,447,919 B1
(45) Date of Patent: Oct. 21, 2025

(54) ROOF RAIL AIRBAG ASSEMBLY

(71) Applicant: GM GLOBAL TECHNOLOGY OPERATIONS LLC, Detroit, MI (US)

(72) Inventors: Vinay Genthikatti, Lake Orion, MI (US); Liqiang Lin, Rochester Hills, MI (US); Brian Bigler, Troy, MI (US)

(73) Assignee: GM GLOBAL TECHNOLOGY OPERATIONS LLC, Detroit, MI (US)

( * ) Notice: Subject to any disclaimer, the term of this patent is extended or adjusted under 35 U.S.C. 154(b) by 0 days.

(21) Appl. No.: 18/817,496

(22) Filed: Aug. 28, 2024

(51) Int. Cl.
*B60R 21/201* (2011.01)
*B60R 21/213* (2011.01)

(52) U.S. Cl.
CPC .......... *B60R 21/201* (2013.01); *B60R 21/213* (2013.01)

(58) Field of Classification Search
CPC ... B60R 21/201; B60R 21/213; B60R 21/232; B60R 21/2342; B60R 2021/161
See application file for complete search history.

(56) References Cited

U.S. PATENT DOCUMENTS

| | | | | |
|---|---|---|---|---|
| 5,613,698 A * | 3/1997 | Patercsak | ............ | B60R 21/2171 280/743.1 |
| 5,765,867 A * | 6/1998 | French | ................ | B60R 21/201 280/743.1 |
| 5,772,239 A * | 6/1998 | Seymour | ................ | B60Q 5/003 200/61.54 |
| 6,070,904 A * | 6/2000 | Ozaki | ................... | B60R 21/16 280/743.1 |
| 6,099,026 A * | 8/2000 | Ando | ................... | B60R 21/201 280/728.1 |
| 6,145,879 A * | 11/2000 | Lowe | ................... | B60R 21/20 280/743.1 |
| 6,481,744 B2 * | 11/2002 | Melia | ................... | B60R 21/201 280/730.2 |
| 6,517,110 B1 * | 2/2003 | Butters | .............. | B60R 21/2338 280/730.2 |
| 6,626,456 B2 * | 9/2003 | Terbu | .................... | B60R 21/20 280/730.2 |
| 6,682,093 B2 * | 1/2004 | Tajima | ................. | B60R 21/201 280/732 |

(Continued)

FOREIGN PATENT DOCUMENTS

JP 2006151277 A 6/2006
JP 2014080102 A * 5/2014

OTHER PUBLICATIONS

German Office Action for German Application No. 102024131120.7; dated Apr. 23, 2025; 4 pages.

*Primary Examiner* — Laura Freedman
(74) *Attorney, Agent, or Firm* — CANTOR COLBURN LLP

(57) ABSTRACT

A roof rail airbag system of a vehicle includes a roof rail airbag (RRAB), and a wrap assembly configured to retain the RRAB when the RRAB is in an uninflated state. The wrap assembly is spaced apart from the RRAB at least partially around an RRAB perimeter. A vehicle includes a vehicle body defining an occupant compartment, and a roof rail airbag system secured to the vehicle body in the occupant compartment. The roof rail airbag system includes a roof rail airbag (RRAB), and a wrap assembly configured to retain the RRAB when the RRAB is in an uninflated state. The wrap assembly is spaced apart from the RRAB at least partially around an RRAB perimeter.

14 Claims, 5 Drawing Sheets

(56) References Cited

U.S. PATENT DOCUMENTS

| | | | | |
|---|---|---|---|---|
| 6,722,693 | B2* | 4/2004 | Ikeda | B60R 21/201 280/730.2 |
| 7,083,188 | B2* | 8/2006 | Henderson | B60R 21/201 280/730.2 |
| 7,159,896 | B2* | 1/2007 | Ochiai | B60R 21/201 280/730.2 |
| 7,213,837 | B2* | 5/2007 | Clarke | B60R 21/201 280/743.1 |
| 7,303,206 | B2* | 12/2007 | Kippschull | B60R 21/213 280/730.2 |
| 7,314,228 | B2* | 1/2008 | Ishiguro | B60R 21/201 280/743.2 |
| 7,407,182 | B2* | 8/2008 | Aoki | B60R 21/201 280/730.2 |
| 7,516,978 | B2* | 4/2009 | Quach | B60R 21/213 280/730.2 |
| 7,661,705 | B2* | 2/2010 | Jacobsson | B60R 21/237 280/730.2 |
| 7,823,914 | B2* | 11/2010 | Cheal | B60R 21/201 280/730.2 |
| 8,002,310 | B2* | 8/2011 | Quach | B60R 21/237 280/730.2 |
| 8,708,365 | B2* | 4/2014 | Fulmer | B60R 21/237 280/730.2 |
| 8,770,619 | B2* | 7/2014 | Nakamura | B60R 21/217 280/730.2 |
| 10,384,636 | B2* | 8/2019 | Shimizu | B60R 21/23138 |
| 10,717,403 | B2* | 7/2020 | Shimizu | B60R 21/201 |
| 11,608,021 | B2* | 3/2023 | DiTrapani | B60R 21/232 |
| 2018/0148012 | A1 | 5/2018 | Ydrén et al. | |

* cited by examiner

ROOF RAIL AIRBAG ASSEMBLY

The subject disclosure relates to vehicles, and in particular to airbag systems of vehicles.

Vehicles utilize airbag systems to improve the safety of vehicle occupants in the event of a collision. These may include, but are not limited to front airbags, seat airbags and roof rail airbags. The roof rail airbags, in particular, are mounted in the roof portion of the vehicle body and are configured to protect the head, neck, and upper torso area of the occupant from injury.

With increased popularity in particular of autonomous and semi-autonomous vehicles, many of which may include rotating seats which might affect occupant proximity to the airbag deployment, there is a desire to improve capability of roof rail airbags to improve protection of vehicle occupants which may be positioned in other than a traditional seating position. Additionally, occupants may be positioned in non-standard arrangements, but within the airbag deployment zone, referred to as out of position (OOP).

SUMMARY

In one exemplary embodiment, a roof rail airbag system of a vehicle includes a roof rail airbag (RRAB), and a wrap assembly configured to retain the RRAB when the RRAB is in an uninflated state. The wrap assembly is spaced apart from the RRAB at least partially around an RRAB perimeter.

In addition to one or more of the features described herein, the wrap assembly has a relatively loose fit to the RRAB, such that a wrap perimeter of the wrap assembly is greater than an RRAB perimeter of the RRAB.

In addition to one or more of the features described herein, the wrap perimeter is at least 10% greater than the RRAB perimeter.

In addition to one or more of the features described herein, the wrap assembly includes two or more wrap segments, and a stitch portion to connect the two or more wrap segments and enclose a segment of the RRAB inside of the wrap assembly.

In addition to one or more of the features described herein, the wrap segments of the two of more wrap segments are one of rectangular, trapezoidal or parallelogrammical in cross-sectional shape.

In addition to one or more of the features described herein, the two or more wrap segments are formed from one or more of a fabric or plastic material.

In addition to one or more of the features described herein, the stitch portion is configured to be a failure location of the wrap assembly during inflation of the RRAB.

In addition to one or more of the features described herein, in an installed position in a vehicle, the stitch portion is positioned vertically above the RRAB.

In addition to one or more of the features described herein, the stitch portion includes a plurality of stitches to connect the two or more wrap segments of the plurality of wrap segments thus retaining the RRAB inside of the wrap assembly.

In addition to one or more of the features described herein an inflator is operably connected to the RRAB configured to inflate the RRAB.

In another exemplary embodiment, a vehicle includes a vehicle body defining an occupant compartment, and a roof rail airbag system secured to the vehicle body in the occupant compartment. The roof rail airbag system includes a roof rail airbag (RRAB), and a wrap assembly configured to retain the RRAB when the RRAB is in an uninflated state. The wrap assembly is spaced apart from the RRAB at least partially around an RRAB perimeter.

In addition to one or more of the features described herein, the wrap assembly has a relatively loose fit to the RRAB, such that a wrap perimeter of the wrap assembly is greater than an RRAB perimeter of the RRAB. The wrap perimeter at least 10% greater than the RRAB perimeter.

In addition to one or more of the features described herein, the roof rail airbag system is installed to a roof rail of the vehicle body.

In addition to one or more of the features described herein, the wrap assembly includes two or more wrap segments, and a stitch portion to connect the two or more wrap segments and enclose a segment of the RRAB inside of the wrap assembly.

In addition to one or more of the features described herein, the wrap segments of the two of more wrap segments are one of rectangular, trapezoidal or parallelogrammical in cross-sectional shape.

In addition to one or more of the features described herein, the two or more wrap segments are formed from one or more of a fabric or plastic material.

In addition to one or more of the features described herein, the stitch portion is configured to be a failure location of the wrap assembly during inflation of the RRAB.

In addition to one or more of the features described herein, in an installed position in a vehicle, the stitch portion is disposed vertically above the RRAB.

In addition to one or more of the features described herein, the stitch portion includes a plurality of stitches to connect the two or more wrap segments of the plurality of wrap segments thus enclosing a segment of the RRAB inside of the wrap assembly.

In yet another exemplary embodiment, a roof rail airbag system of a vehicle a roof rail airbag (RRAB) and a wrap assembly configured to retain the RRAB when the RRAB is in an uninflated state. The wrap assembly is spaced apart from the RRAB at least partially around an RRAB perimeter. The wrap assembly has a relatively loose fit to the RRAB, such that a wrap perimeter of the wrap assembly is at least 10% greater than the RRAB perimeter. The wrap assembly includes two or more wrap segments and a stitch portion to connect the two or more wrap segments and enclose a segment of the RRAB inside of the wrap assembly. The stitch portion is configured to be agm1 failure location of the wrap assembly during inflation of the RRAB. In an installed position in a vehicle, the stitch portion is positioned vertically above the RRAB.

The above features and advantages, and other features and advantages of the disclosure are readily apparent from the following detailed description when taken in connection with the accompanying drawings.

BRIEF DESCRIPTION OF THE DRAWINGS

Other features, advantages and details appear, by way of example only, in the following detailed description, the detailed description referring to the drawings in which.

DETAILED DESCRIPTION

Figure 1:
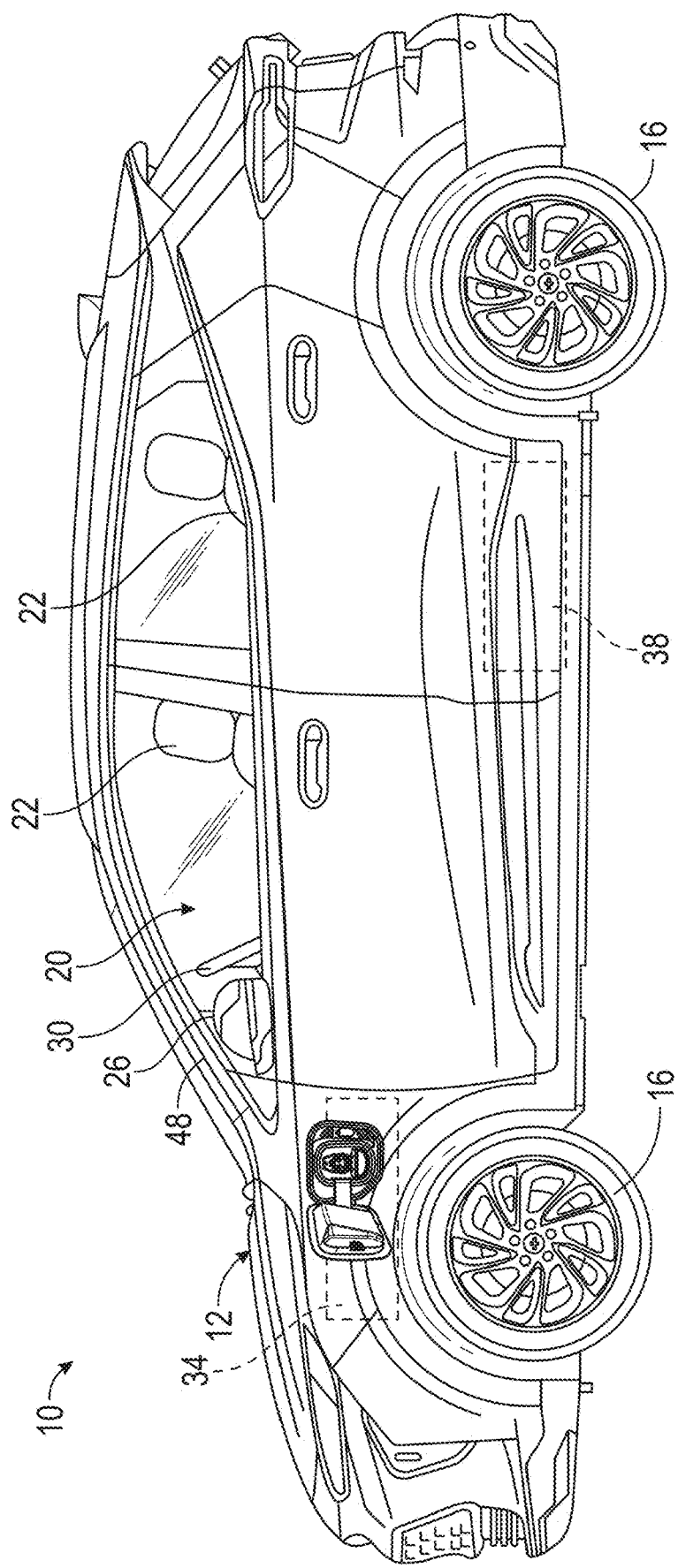
FIG. 1 is a schematic illustration of an embodiment of a vehicle.

The following description is merely exemplary in nature and is not intended to limit the present disclosure, its application or uses. It should be understood that throughout the drawings, corresponding reference numerals indicate like or corresponding parts and features.

In accordance with an exemplary embodiment a vehicle, in accordance with a non-limiting example, is indicated generally at 10 in FIG. 1. Vehicle 10 includes a body 12 supported on a plurality of wheels 16. In a non-limiting example, two of the plurality of wheels 16 are steerable. Body 12 defines, in part, an occupant compartment 20 having seats 22 positioned behind a dashboard 26. A steering control 30 is arranged between seats 22 and dashboard 26. Steering control 30 is operated to control orientation of the steerable wheel(s). Vehicle 10 includes an electric motor 34 connected to a transmission that provides power to one or more of the plurality of wheels 16. In some embodiments, a rechargeable energy storage system (RESS) assembly 38 provides power to the electric motor 34.

Figure 2:
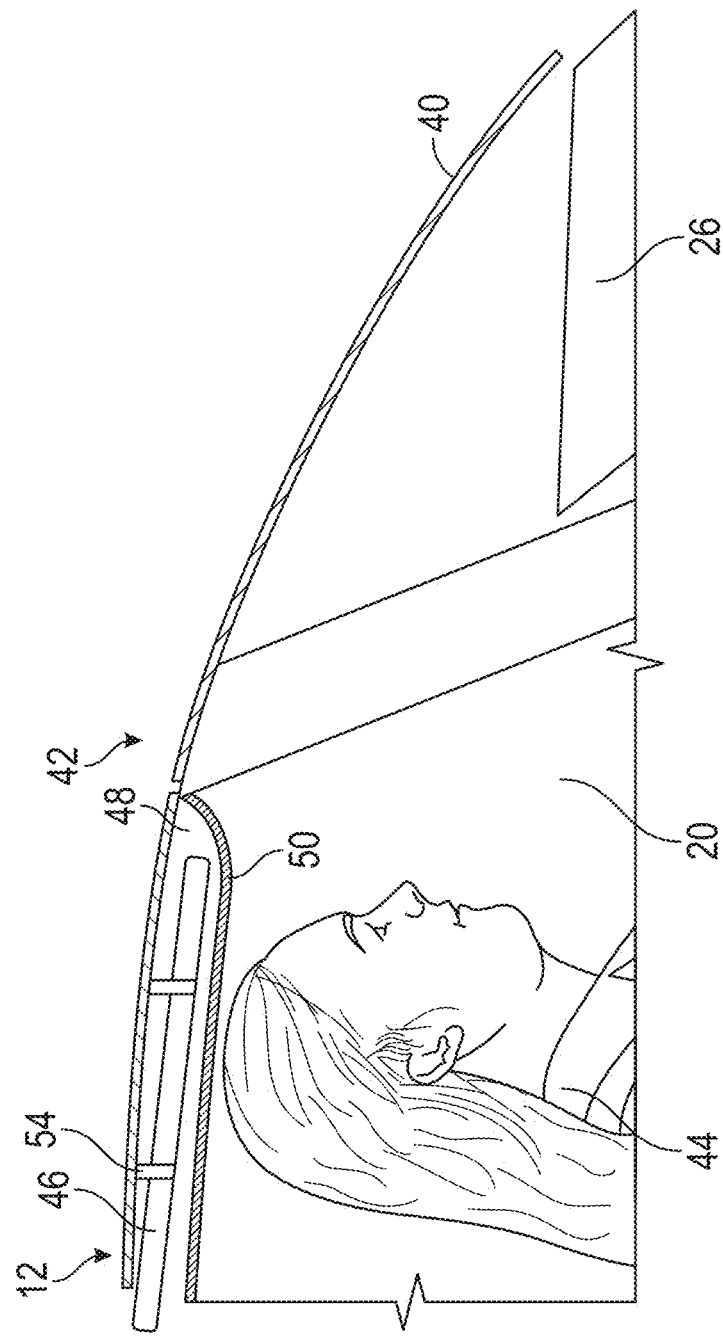
FIG. 2 is a partial cross-sectional view of an embodiment of an occupant compartment of a vehicle.

Referring now to FIG. 2, illustrated is a partial cross-sectional view of an embodiment of an occupant compartment 20. A windshield 40 is located in a windshield opening 42 of the body 12, and an occupant 44 of the vehicle 10 is seated behind the dashboard 26. The occupant compartment 20 further includes one or more inflatable protective devices, also known as airbags, which includes one or more roof rail airbag (RRAB) systems 46 extending at least partially along a roof rail 48 of the body 12.

Figure 3:
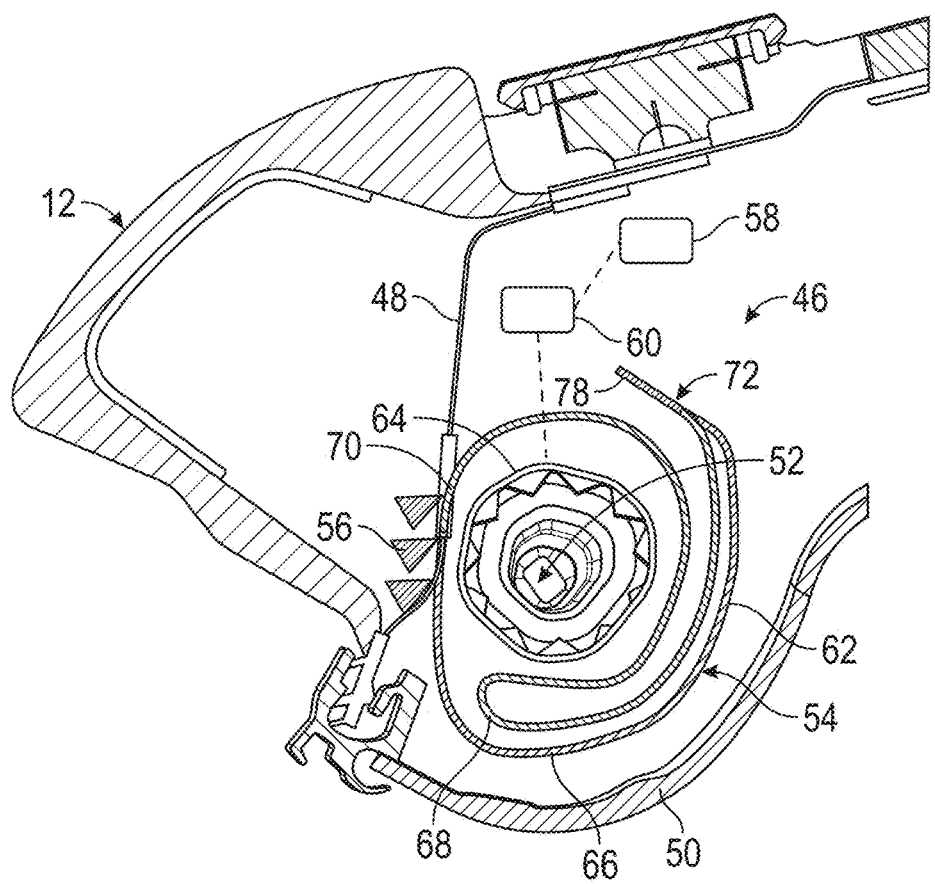
FIG. 3 is a partial cross-section view of an embodiment of a roof rail airbag system installed in a vehicle.

A cross-sectional view of an RRAB system 46 installed to a roof rail 48 is illustrated in FIG. 3. The RRAB system 46 is installed to the roof rail 48 and is positioned between the roof rail 48 and a headliner 50 of the vehicle 10.

The RRAB system 46 includes an RRAB 52 having a wrap assembly 54 extending around at least a portion of the RRAB 52 to retain the RRAB 52 in a desired stowed state, which in some embodiments is folded, rolled, and/or bundled. The RRAB system 46 is secured to the roof rail 48 via one or more fasteners 56 extending through the wrap assembly 54. The RRAB system 46 further includes a controller 58 and an inflator mechanism 60 operably connected to the controller 58 and the RRAB 52 to inflate the RRAB 52 when signaled by the controller 58. The wrap assembly 54 is spaced apart from the RRAB 52 at least partially around an RRAB perimeter 64 of the RRAB 52. The wrap assembly 54 is sized and configured such that the wrap assembly 54 fits loosely around the RRAB 52, defining a wrap perimeter 62 that is greater than the RRAB perimeter 64. In some embodiments, the wrap perimeter 62 is in the range of 10% to 500% greater than the RRAB perimeter 64.

Figure 4:
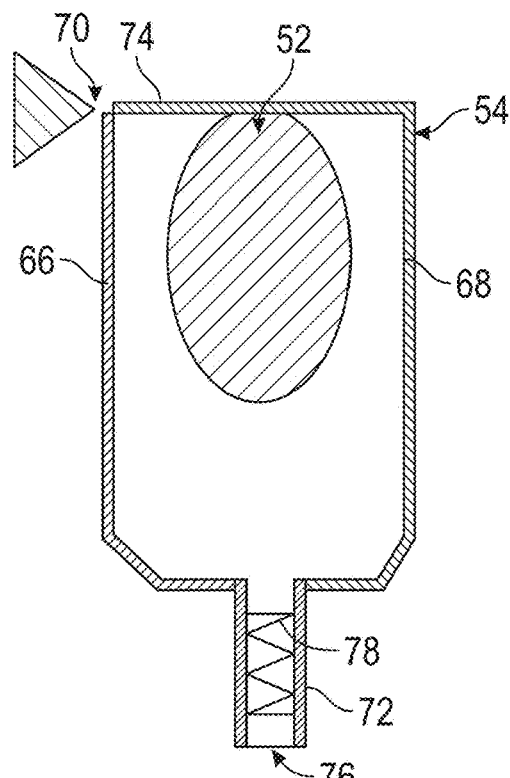
FIG. 4 is a schematic illustration of an embodiment of a roof rail airbag and wrap assembly.
Figure 5A:
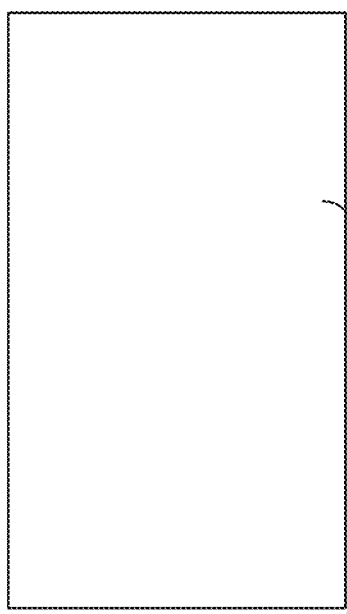
FIG. 5A is a schematic illustration of an embodiment of a wrap segment of a wrap assembly.
Figure 5B:
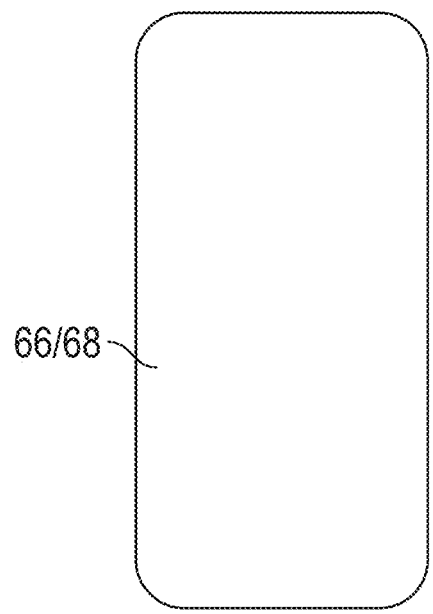
FIG. 5B is a schematic illustration of another embodiment of a wrap segment of a wrap assembly.
Figure 5C:
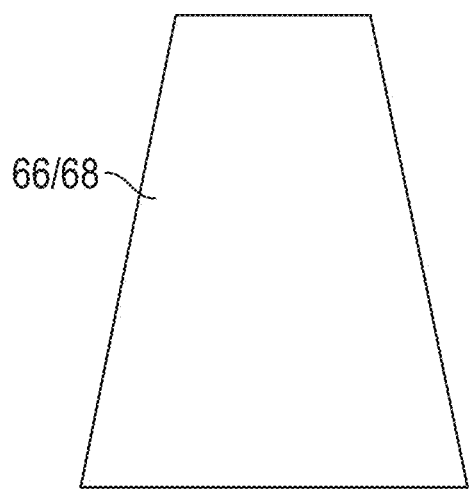
FIG. 5C is a schematic illustration of yet another embodiment of a wrap segment of a wrap assembly.
Figure 5D:
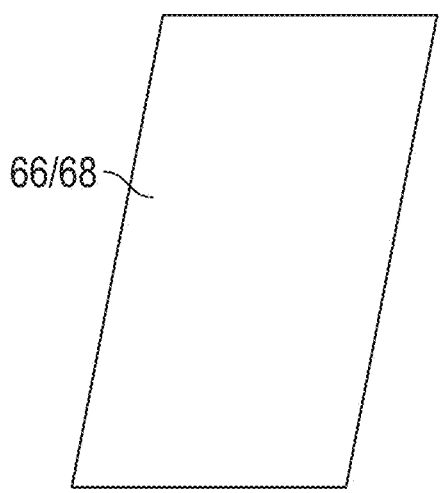
FIG. 5D is a schematic illustration of still another embodiment of a wrap segment of a wrap assembly.

Referring now to FIG. 4, the wrap assembly 54 includes a first wrap segment 66 and a second wrap segment 68, which are joined at, for example, a mounting location 70 to the roof rail 48. The first wrap segment 66 and the second wrap segment 68 are formed from, for example, a fabric or a plastic material, for example a thermoplastic olefin (TPO) material. In some embodiments, the wrap segments 66 and 68 are formed from the same material, while in other embodiments different materials may be used. Exemplary shapes of the wrap segments 66 and 68 are illustrated in FIGS. 5A-5D. The exemplary shapes illustrated include rectangular, rounded rectangular, trapezoidal or parallelogrammical. It is to be appreciated that the illustrated shapes are merely exemplary and that other shapes may be utilized. Further, while in some embodiments the sizes and/or shapes of the wrap segments 66 and 68 are the same, in other embodiments the size and/or shape of first wrap segment 66 is different from the size and/or shape of the second wrap segment 68. The size and shape of the wrap segments 66 and 68 may be varied based on the size and/or shape of the RRAB 52. Additionally, while two wrap segments 66 and 68 are described herein, in other embodiments other quantities of wrap segments, such as three, four or more wrap segments may be utilized to define the wrap assembly 54.

Figure 6A:
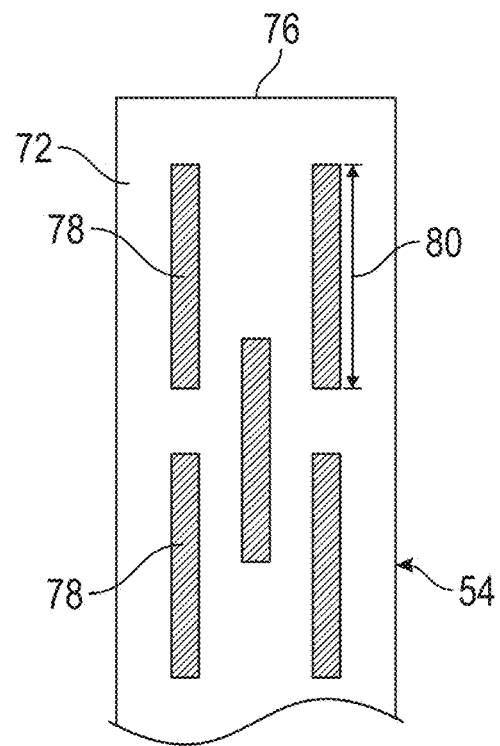
FIG. 6A is a schematic illustration of an embodiment of a stitch portion of a wrap assembly.
Figure 6B:
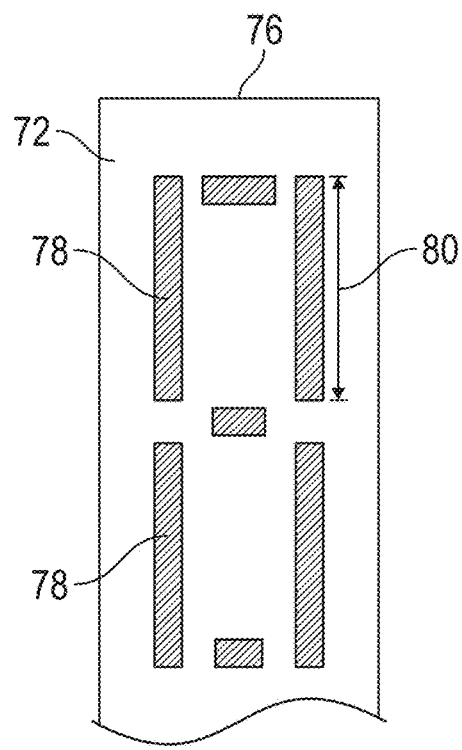
FIG. 6B is a schematic illustration of another embodiment of a stitch portion of a wrap assembly.

Referring again to FIG. 4, once the RRAB 52 is placed in the wrap assembly 54, the wrap assembly 54 is closed at a stitch portion 72. While the mounting location 70 may define a first end 74 of the wrap assembly 54, the stitch portion 72 defines a second end 76 of the wrap assembly 54 opposite the first end 74. As illustrated in FIGS. 6A and 6B, the stitch portion 72 includes one or more stitches 78. The stitches 78 may vary in stitch length 80, stitch arrangement, stitch pattern, and stitch material to close the wrap assembly 54 while allowing the RRAB 52 to inflate with the desired properties such as inflation rate, with the stitch portion 72 being the point of failure of the wrap assembly 54 during inflation of the RRAB 52.

Referring again to FIG. 3, in some embodiments the RRAB system 46 is installed to the body 12 so that the stitch portion 72 is located vertically above the RRAB 52. The relatively loose configuration of the wrap assembly 54 relative to the RRAB 52 slows the speed of deployment of the RRAB 52 for a few milliseconds before contact with an occupant 44 of the vehicle, especially when the occupant 44 is out of position, thus reducing an impact load on the occupant 44. The relatively loose configuration of the wrap assembly 54 does not, however, delay full fill timing of the RRAB 52 since the inflation of the RRAB 52 catches up to the desired inflation rate in the subsequent stages of deployment of the RRAB 52, which is important for in-position occupant safety load cases.

The terms "a" and "an" do not denote a limitation of quantity, but rather denote the presence of at least one of the referenced item. The term "or" means "and/or" unless clearly indicated otherwise by context. Reference throughout the specification to "an aspect", means that a particular element (e.g., feature, structure, step, or characteristic) described in connection with the aspect is included in at least one aspect described herein, and may or may not be present in other aspects. In addition, it is to be understood that the described elements may be combined in any suitable manner in the various aspects.

When an element such as a layer, film, region, or substrate is referred to as being "on" another element, it can be directly on the other element or intervening elements may also be present. In contrast, when an element is referred to as being "directly on" another element, there are no intervening elements present.

Unless specified to the contrary herein, all test standards are the most recent standard in effect as of the filing date of this application, or, if priority is claimed, the filing date of the earliest priority application in which the test standard appears.

Unless defined otherwise, technical and scientific terms used herein have the same meaning as is commonly understood by one of skill in the art to which this disclosure belongs.

While the above disclosure has been described with reference to exemplary embodiments, it will be understood by those skilled in the art that various changes may be made and equivalents may be substituted for elements thereof without departing from its scope. In addition, many modifications may be made to adapt a particular situation or material to the teachings of the disclosure without departing from the essential scope thereof. Therefore, it is intended that the present disclosure not be limited to the particular embodiments disclosed, but will include all embodiments falling within the scope thereof.

What is claimed is:

1. A roof rail airbag system of a vehicle, comprising:
a roof rail airbag (RRAB); and
a wrap assembly configured to retain the RRAB when the RRAB is in an uninflated state;
wherein the wrap assembly is spaced apart from the RRAB at least partially around an RRAB perimeter;
wherein the wrap assembly includes:
two or more wrap segments; and
a stitch portion to connect the two or more wrap segments and enclose a segment of the RRAB inside of the wrap assembly;
wherein the stitch portion is configured to be a failure location of the wrap assembly during inflation of the RRAB; and
wherein, in an installed position in the vehicle, the stitch portion is disposed vertically above the RRAB.

2. The roof rail airbag system of claim 1, wherein the wrap assembly has a relatively loose fit to the RRAB, such that a wrap perimeter of the wrap assembly is greater than the RRAB perimeter of the RRAB when the RRAB and the wrap assembly are in the installed position in the vehicle.

3. The roof rail airbag system of claim 2, wherein the wrap perimeter is at least 10% greater than the RRAB perimeter when the RRAB and the wrap assembly are in the installed position in the vehicle.

4. The roof rail airbag system of claim 1, wherein one or more wrap segments of the two or more wrap segments are one of rectangular, trapezoidal or parallelogrammical in cross-sectional shape.

5. The roof rail airbag system of claim 1, wherein the two or more wrap segments are formed from one or more of a fabric or plastic material.

6. The roof rail airbag system of claim 1, wherein the stitch portion includes a plurality of stitches to connect the two or more wrap segments thus enclosing the RRAB inside of the wrap assembly.

7. The roof rail airbag system of claim 1, further comprising an inflator operably connected to the RRAB configured to inflate the RRAB.

8. A vehicle, comprising:
a vehicle body defining an occupant compartment; and
a roof rail airbag system secured to the vehicle body in the occupant compartment, the roof rail airbag system including:
a roof rail airbag (RRAB); and
a wrap assembly configured to retain the RRAB when the RRAB is in an uninflated state;
wherein the wrap assembly is spaced apart from the RRAB at least partially around an RRAB perimeter;
wherein the wrap assembly includes:
two or more wrap segments; and
a stitch portion to connect the two or more wrap segments and enclose a segment of the RRAB inside of the wrap assembly;
wherein the stitch portion is configured to be a failure location of the wrap assembly during inflation of the RRAB; and
wherein, in an installed position in the vehicle, the stitch portion is disposed vertically above the RRAB.

9. The vehicle of claim 8, wherein the wrap assembly has a relatively loose fit to the RRAB, such that a wrap perimeter of the wrap assembly is greater than the RRAB perimeter of the RRAB when the RRAB and the wrap assembly are in the installed position in the vehicle;
wherein the wrap perimeter is at least 10% greater than the RRAB perimeter when the RRAB and the wrap assembly are in the installed position in the vehicle.

10. The vehicle of claim 8, wherein the roof rail airbag system is installed to a roof rail of the vehicle body.

11. The vehicle of claim 8, wherein one or more wrap segments of the two or more wrap segments are one of rectangular, trapezoidal or parallelogrammical in cross-sectional shape.

12. The vehicle of claim 8, wherein the two or more wrap segments are formed from one or more of a fabric or plastic material.

13. The vehicle of claim 8, wherein the stitch portion includes a plurality of stitches to connect the two or more wrap segments thus enclosing a segment of the RRAB inside of the wrap assembly.

14. A roof rail airbag system of a vehicle, comprising:
a roof rail airbag (RRAB); and
a wrap assembly configured to retain the RRAB when the RRAB is in an uninflated state;
wherein the wrap assembly is spaced apart from the RRAB at least partially around an RRAB perimeter;
wherein the wrap assembly has a relatively loose fit to the RRAB, such that a wrap perimeter of the wrap assembly is at least 10% greater than the RRAB perimeter when the RRAB and the wrap assembly are in an installed position in the vehicle;
wherein the wrap assembly includes:
two or more wrap segments; and
a stitch portion to connect the two or more wrap segments and enclose a segment of the RRAB inside of the wrap assembly;
wherein the stitch portion is configured to be a failure location of the wrap assembly during inflation of the RRAB;
wherein, in the installed position in the vehicle, the stitch portion is disposed vertically above the RRAB.

* * * * *